United States Patent
Grau et al.

(10) Patent No.: US 9,568,639 B2
(45) Date of Patent: Feb. 14, 2017

(54) BOREHOLE TOOL CALIBRATION METHOD

(71) Applicant: Schlumberger Technology Corporation, Sugar Land, TX (US)

(72) Inventors: James Grau, Marshfield, MA (US); Jeffrey Miles, Arlington, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/279,935

(22) Filed: May 16, 2014

(65) Prior Publication Data
US 2015/0331144 A1 Nov. 19, 2015

(51) Int. Cl.
| | | |
|---|---|---|
| G01V 5/04 | (2006.01) | |
| G01V 5/12 | (2006.01) | |
| G01V 13/00 | (2006.01) | |
| G01V 5/10 | (2006.01) | |

(52) U.S. Cl.
CPC ............... *G01V 5/12* (2013.01); *G01V 5/101* (2013.01); *G01V 13/00* (2013.01)

(58) Field of Classification Search
CPC .............................. G01V 5/101; G01T 7/005
USPC ......................................................... 259/257
See application file for complete search history.

(56) References Cited

U.S. PATENT DOCUMENTS

| | | |
|---|---|---|
| 4,445,033 A | 4/1984 | Preeg et al. |
| 4,661,701 A | 4/1987 | Grau |
| 4,717,825 A * | 1/1988 | Smith, Jr. ................ G01T 1/40 250/256 |
| 4,816,674 A | 3/1989 | Ellis et al. |
| 5,293,410 A | 3/1994 | Chen et al. |
| 5,334,833 A | 8/1994 | Case et al. |
| 5,377,105 A | 12/1994 | Smith |
| 5,699,246 A | 12/1997 | Plasek et al. |
| 6,289,283 B1 | 9/2001 | Plasek |

(Continued)

FOREIGN PATENT DOCUMENTS

| | | |
|---|---|---|
| CN | 1270270 A | 10/2000 |
| CN | 1619100 A | 5/2005 |

(Continued)

OTHER PUBLICATIONS

US 5,389,367, 05/2002, Plasek (withdrawn)

(Continued)

*Primary Examiner* — David J Makiya
*Assistant Examiner* — Kenneth J Malkowski
(74) *Attorney, Agent, or Firm* — David G. Matthews

(57) ABSTRACT

A borehole tool calibration method may include obtaining a measured energy spectrum for at least one geological constituent based upon a first borehole tool, generating a calculated energy spectrum for the at least one geological constituent for the first borehole tool, and generating a calculated energy spectrum for the at least one geological constituent for a second borehole tool different than the first borehole tool. The method may further include determining a relationship between the calculated energy spectra for the first and second borehole tools, and determining a calibration parameter for the second borehole tool based upon the measured energy spectrum and the relationship between the calculated energy spectra for the first and second borehole tools.

20 Claims, 12 Drawing Sheets
(7 of 12 Drawing Sheet(s) Filed in Color)

(56) References Cited

U.S. PATENT DOCUMENTS

| | | | |
|---|---|---|---|
| 6,389,367 | B1 | 5/2002 | Plasek |
| 7,366,615 | B2 | 4/2008 | Herron et al. |
| 7,667,192 | B2 | 2/2010 | Fricke et al. |
| 2004/0104821 | A1 | 6/2004 | Clark |
| 2006/0065824 | A1* | 3/2006 | Mickael .............. E21B 47/0005 250/252.1 |
| 2006/0243898 | A1* | 11/2006 | Gilchrist ................ G01V 5/101 250/269.7 |
| 2007/0023626 | A1 | 2/2007 | Riley et al. |
| 2007/0144740 | A1 | 6/2007 | Guo et al. |
| 2009/0045328 | A1 | 2/2009 | Fricke et al. |
| 2009/0090505 | A1 | 4/2009 | McDaniel et al. |
| 2010/0004867 | A1 | 1/2010 | Zhou et al. |
| 2011/0253364 | A1 | 10/2011 | Mosse et al. |
| 2013/0134304 | A1* | 5/2013 | Beekman .................. G01T 1/40 250/269.6 |
| 2013/0158876 | A1 | 6/2013 | Grau |
| 2013/0214145 | A1 | 8/2013 | Roscoe et al. |
| 2015/0090871 | A1* | 4/2015 | Chace ..................... E21B 47/00 250/269.7 |
| 2015/0331141 | A1 | 11/2015 | Grau et al. |

FOREIGN PATENT DOCUMENTS

| | | |
|---|---|---|
| GB | 2298918 B | 1/1999 |
| WO | 2013006073 A1 | 1/2013 |

OTHER PUBLICATIONS

Office Action issued in related CN Application No. 201280036556.5 mailed Dec. 23, 2015, with English translation by Agent (17 pages).

International Search Report and Written Opinion issued in related to PCT application PCT/US2015/030701 on Aug. 20, 2015, 4 pages.

Office Action issued in related MX Application No. MX/a12013/013612 mailed Feb. 3, 2015, with English translation by Agent (8 pages).

A. Mendoza, Linear iterative refinement method for the rapid simulation of borehole nuclear measurements, Part I: Vertical wells,: Geophysics, 75, No. 1, pp. E9—E29.

A. Mendoza, et al., "Linear iterative refinement method for the rapid simulation of borehole nuclear measurements: Part 2—High-angle and horizontal wells," Geophysics, Society of Exploration Geophysicists, US, vol. 75, No. 2, Mar. 1, 2010, pp. E79-E90.

A. Mendoza, et al, "Rapid Simulation of Borehole Nuclear Measurements with Approximate Spatial Flux-Scattering Functions," SPWLA 48th Annual Logging Symposium, Jun. 3-6, 2007.

D.V. Ellis, et al, "The Effect of Formation Absorption on the Thermal Neutron Porosity Measurement," Paper 16814-MS, 62nd SPE Annual Technical Conference and Exhibition, Dallas, Texas 1987.

D. Dworak, et al, "Numerical modeling of the gamma-gamma density tool responses in horizontal wells with an axial asymmetry," Applied Radiation and Isotopes, Elsevier, vol. 69, No. 1, Jan. 1, 2011, pp. 268-274.

C.C. Watson, "Monte Carlo Computation of Differential Sensitivity Functions," Trans. Am Nucl. Soc., vol. 46, P. 655, 1984.

C.C. Watson, "A Spatial Sensitivity Analysis Technique for Neutron and Gamma-Ray Measurements," Trans. Am Nucl. Soc., vol. 65 (Suppl. 1), pp. 3-4, 1992.

Ellis and Singer, "Well Logging for Earth Scientists", pp. 338-342, 2nd edition, Springer 2007.

* cited by examiner

US 9,568,639 B2

BOREHOLE TOOL CALIBRATION METHOD

BACKGROUND

The decomposition of neutron-induced gamma ray spectra using full-energy reconstruction based on a linear combination of elemental standard spectra has been applied in many industries. Normally these elemental standard spectra are measured in a controlled environment that may not be representative of the environment to which they are applied. Anything in the application environment that significantly alters the effects of gamma ray scattering may make the elemental standards derived from the more simplistic environment inappropriate for the application environment. For example, changes in density have an impact on gamma ray scattering, and changes in hydrogen concentration may change the characteristic distribution of neutrons that defines the gamma ray source.

For oil well logging inside a borehole cased with a metal (e.g., steel) casing and/or cement, the additional gamma ray scattering from both the metal casing and cement reduces the total number of detected gamma rays. Moreover, this also changes the spectral character of the detected gamma ray spectra since the effects of scattering are very dependent on the energies of the gamma rays. It is possible to measure an energy spectrum for a given geological constituent(s) in a reference (e.g., open-hole) environment, and then transform the measured spectrum to account for the changes in scattering (e.g., from a casing, etc.). However, to extrapolate such measurements to a different borehole environment (e.g., a cased borehole) would ordinarily warrant using Monte Carlo modeling to follow the entire history of each of the hundreds of gamma ray lines of different energies and intensities that contribute to the final spectrum, which may not be practical or even possible in many applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A borehole tool calibration method may include obtaining a measured energy spectrum for at least one geological constituent based upon a first borehole tool, generating a calculated energy spectrum for the at least one geological constituent for the first borehole tool, and generating a calculated energy spectrum for the at least one geological constituent for a second borehole tool different than the first borehole tool. The method may further include determining a relationship between the calculated energy spectra for the first and second borehole tools, and determining a calibration parameter for the second borehole tool based upon the measured energy spectrum and the relationship between the calculated energy spectra for the first and second borehole tools.

A related apparatus is for calibrating a borehole tool and may include a processor and a memory cooperating therewith to obtain a measured energy spectrum for at least one geological constituent based upon a first borehole tool, generate a calculated energy spectrum for the at least one geological constituent for the first borehole tool, generate a calculated energy spectrum for the at least one geological constituent for a second borehole tool different than the first borehole tool, determine a relationship between the calculated energy spectra for the first and second borehole tools, and determine a calibration parameter for the second borehole tool based upon the measured energy spectrum and the relationship between the calculated energy spectra for the first and second borehole tools.

A related non-transitory computer-readable medium may have computer-executable instruction for causing a computer to at least obtain a measured energy spectrum for at least one geological constituent based upon a first borehole tool, generate a calculated energy spectrum for the at least one geological constituent for the first borehole tool, generate a calculated energy spectrum for the at least one geological constituent for a second borehole tool different than the first borehole tool, determine a relationship between the calculated energy spectra for the first and second borehole tools, and determine a calibration parameter for the second borehole tool based upon the measured energy spectrum and the relationship between the calculated energy spectra for the first and second borehole tools.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
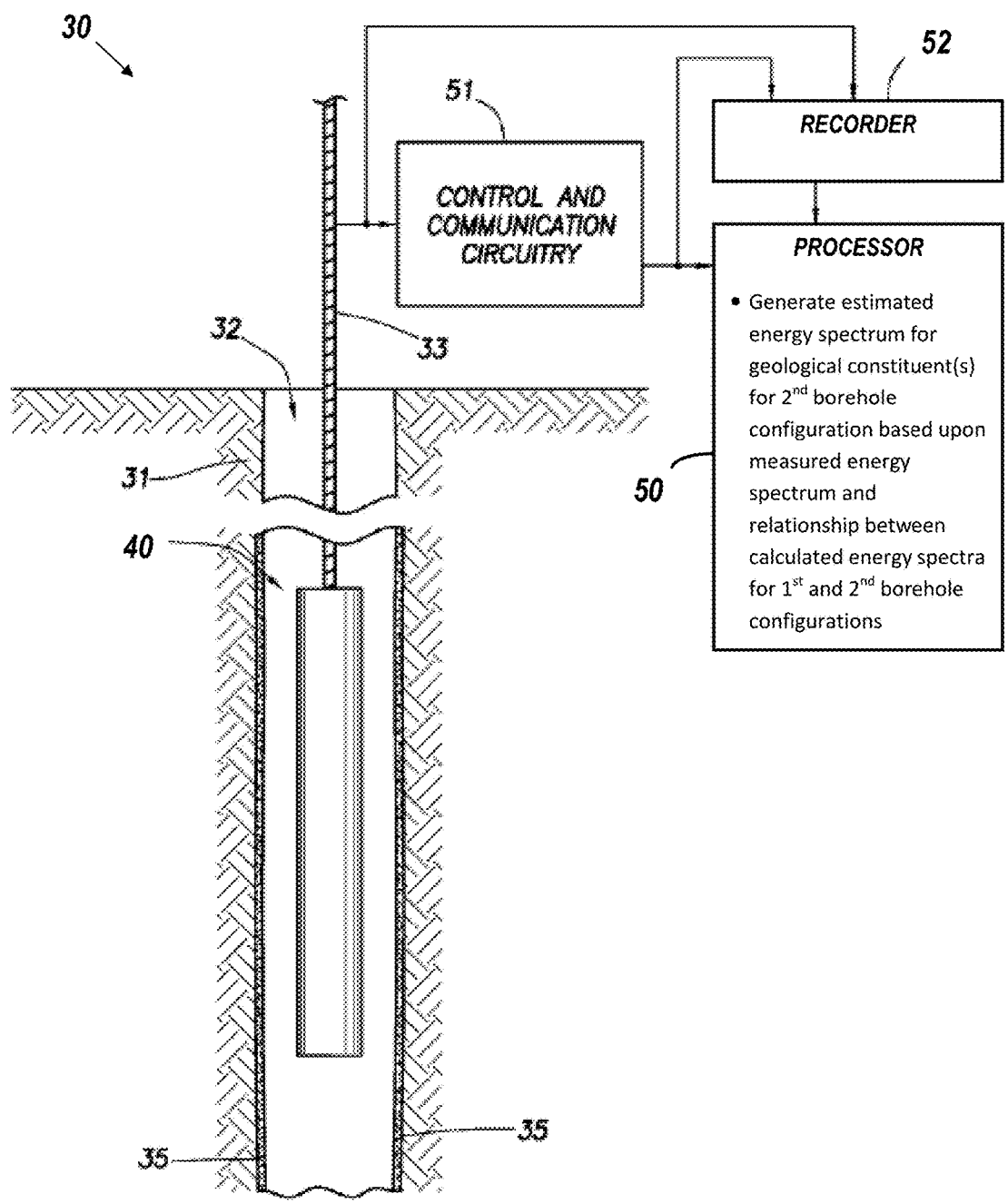
FIG. 1 is a schematic diagram, partially in block form, of a well logging apparatus which may be used for estimating at least one geological constituent in accordance with an example embodiment.

Referring initially to FIG. 1, a well logging system 30 is first described. A borehole 32 is drilled in a formation 31 with drilling equipment, and may use drilling fluid or mud. One or more portions of the borehole 32 may be lined with a casing 35, which may include metal (e.g., steel) cylindrical tubing, coiled tubing, cement, or both. Other configurations may include: non-metallic casings such as fiberglass, high strength plastic, nano-material reinforced plastics etc; screens as used in some completions to prevent or reduce sanding; and slotted liners that may be used in completion of horizontal wells, for example. A logging device or tool 40 is suspended in the borehole 32 on an armored multiconductor cable 33 to provide a wireline configuration, although other configurations such as logging while drilling (LWD), measurement while drilling (MWD), Slickline, coiled tubing or configurations such as logging while tripping may also be used. The length of the cable 33 substantially determines the depth of the device 40 within the borehole 32. A depth gauge apparatus may be provided to measure cable displacement over a sheave wheel (not shown), and thus the depth of logging device 40 in the borehole 32.

Control and communication circuitry 51 is shown at the surface of the formation 31, although portions thereof may be downhole. Also, a recorder 52 is also illustratively included for recording well-logging data, as well as a processor 50 for processing the data. However, one or both of the recorder 52 and processor 50 may be remotely located from the well site. The processor 50 may be implemented using one or more computing devices with appropriate hardware (e.g., microprocessor, etc.) and non-transitory computer-readable medium components having computer-readable instructions for performing the various operations described herein. It should also be noted that recorder 52 may also be located in the tool, as may be the case in LWD tools, which may only send a certain amount of data to the surface while storing the bulk of the data in memory downhole to be read out at the surface after tripping out of the hole. In Slickline implementations there may be no communication with the surface, and data will be recorded and may be processed downhole for later retrieval and potentially further processing at the surface or a remote location.

The tool 40 may include one or more type of logging devices that take measurements from which formation characteristics may be determined. For example, the logging device may be an electrical type of logging device (including devices such as resistivity, induction, and electromagnetic propagation devices), a nuclear logging device, a sonic logging device, or a fluid sampling logging device, as well as combinations of these and other devices. Devices may be combined in a tool string and/or used during separate logging runs. Also, measurements may be taken during drilling, tripping, and/or sliding. Some examples of the types of formation characteristics that may be determined using these types of devices include the following: determination, from deep three-dimensional electromagnetic measurements, of distance and direction to faults or deposits such as salt domes or hydrocarbons; determination, from acoustic shear and/or compressional wave speeds and/or wave attenuations, of formation porosity, permeability, and/or lithology; determination of formation anisotropy from electromagnetic and/or acoustic measurements; determination, from attenuation and frequency of a rod or plate vibrating in a fluid, of formation fluid viscosity and/or density; determination, from resistivity and/or nuclear magnetic resonance (NMR) measurements, of formation water saturation and/or permeability; determination, from count rates of gamma rays and/or neutrons at spaced detectors, of formation porosity and/or density; and determination, from electromagnetic, acoustic and/or nuclear measurements, of formation bed thickness.

Generally speaking, the present disclosure provides a reliable technique for transforming elemental standard spectra that have been carefully measured in a reference (e.g., open-hole) environment to elemental standard spectra appropriate for another (e.g., cased-hole) environment by accounting for the differences in gamma-ray scattering between the two environments. In an example embodiment, the measured open-hole standard spectrum for each element may be multiplied by the ratio of calculated (e.g., via Monte Carlo modeling) standards for that element in the cased-hole and open-hole environments, respectively. An advantage of the approaches outlined herein are that they avoid the task of measuring cased-hole elemental standard spectra for each casing size that might be encountered during oil field measurements, a task which is difficult, time consuming, and the results of which are potentially inaccurate. The present approach provides for calculating the elemental standard spectra based on Monte Carlo calculations of the gamma ray scattering response as a function of gamma ray energy. In addition to the cased-hole application, this also can be used to transform elemental standards to account for other environmental variation such as formation density, hole size, and other downhole conditions, as well as certain tool-to-tool variations. The techniques described herein may be used with various gamma-ray techniques and/or devices, including wireline or LWD tools, chemical or electronic source of neutrons, as well as inelastic or capture reactions. It should be noted that the approaches described herein are not reserved to inelastic or capture reactions, as they may also apply to gamma rays from activation and to natural gamma rays or gamma rays emitted by radioactive contaminants in the ground.

By way of background, many different diameters and thicknesses of both casing and cement are encountered in oil wells. It would be possible, but not necessarily practical, to measure and extract elemental standard spectra for numerous combinations of casing and cement size that are likely to be encountered. Moreover, the addition of casing and cement in laboratory measurements of standards would notably complicate the extraction of the single-element spectral shapes, making it difficult if not impossible to arrive at a consistent set of elemental standard spectra across the range of casing and cement sizes. This lack of consistency in the elemental standards would directly affect the accuracy of the final elemental concentrations from the spectral analysis.

Rather than measuring a complete set of elemental standard spectra for each unique environment, the approach set forth herein may be used with one or more sets of elemental standards that have been measured and extracted in one environment (e.g. open-hole), which may then be transformed or extrapolated to another environment (e.g., using Monte Carlo calculations) to quantify the differences in spectral shape between the different environments. It should be noted that the present approach may also be applied to improve open hole standards if such standard measurements are done in environments that are not representative of or similar to the environment in which other standard measurements are taken. An example may be measuring a standard spectrum for iron using an iron pipe surrounding the tool in a large water tank. Such spectrum is not entirely representative of an iron signal from iron distributed in a geological formation, however, for the purposes of this discussion the term "geological formation" is used to cover such elements in a geological environment or in such a stand-alone implementation. The transformation may be a ratio of the Monte Carlo calculated spectral shapes of each elemental standard for the different environments. While Monte Carlo calculations of elemental spectra by themselves may not be sufficiently accurate to replace the measured spectra, the ratios of such Monte Carlo calculations may be sufficiently accurate to account for the environmental changes, thus allowing for the transformation or extrapolation of the measured elemental spectra to a different borehole configuration or environment.

Figure 2:
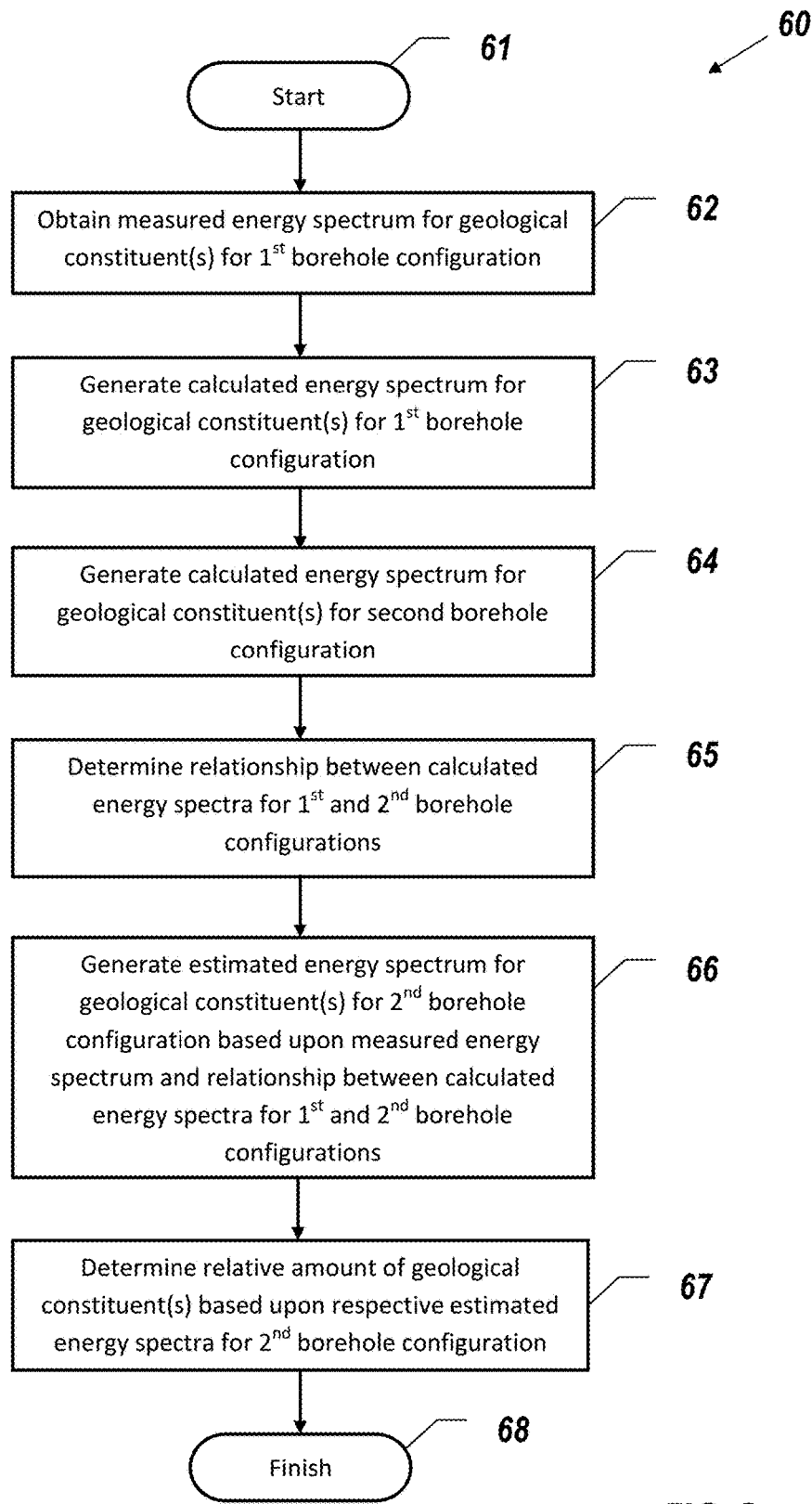
FIG. 2 is a flow diagram illustrating a method for estimating geological constituents across different borehole configurations in accordance with an example embodiment.

Referring initially to the flow diagram 60 of FIG. 2, beginning at Block 61, an example approach for estimating one or more geological constituents illustratively includes obtaining a measured energy spectrum for at least one geological constituent for a first borehole configuration, at Block 62, generating a calculated energy spectrum for the at least one geological constituent for the first borehole configuration (Block 63), and generating a calculated energy spectrum for the at least one geological constituent for a second borehole configuration different than the first borehole configuration (Block 64). By way of example, the first borehole configuration may be an open-hole (uncased) borehole configuration, whereas the second borehole configuration may be a cased or lined hole configuration (e.g., cement and/or steel casing, etc.). However, it should be noted that in some embodiments, the different borehole configurations could correspond to different factors besides casings or liners, such as different density or porosity configurations, etc., as will be discussed further below.

The method further illustratively includes determining a relationship (e.g., a ratio) between the calculated energy spectra for the first and second borehole configurations, at Block 65, and generating an estimated energy spectrum for the at least one geological constituent for the second borehole configuration based upon the measured energy spectrum and the relationship between the calculated energy spectra for the first and second borehole configurations, at Block 66. As will be appreciated by those skilled in the art, the estimated energy spectrum may then be used to determine a relative amount (e.g., a percentage) of the geological constituent(s) present adjacent to the second borehole, at Block 67, by comparison with measured element spectra for various constituents in the formation. The method of FIG. 2 illustratively concludes at Block 68.

Figure 3:
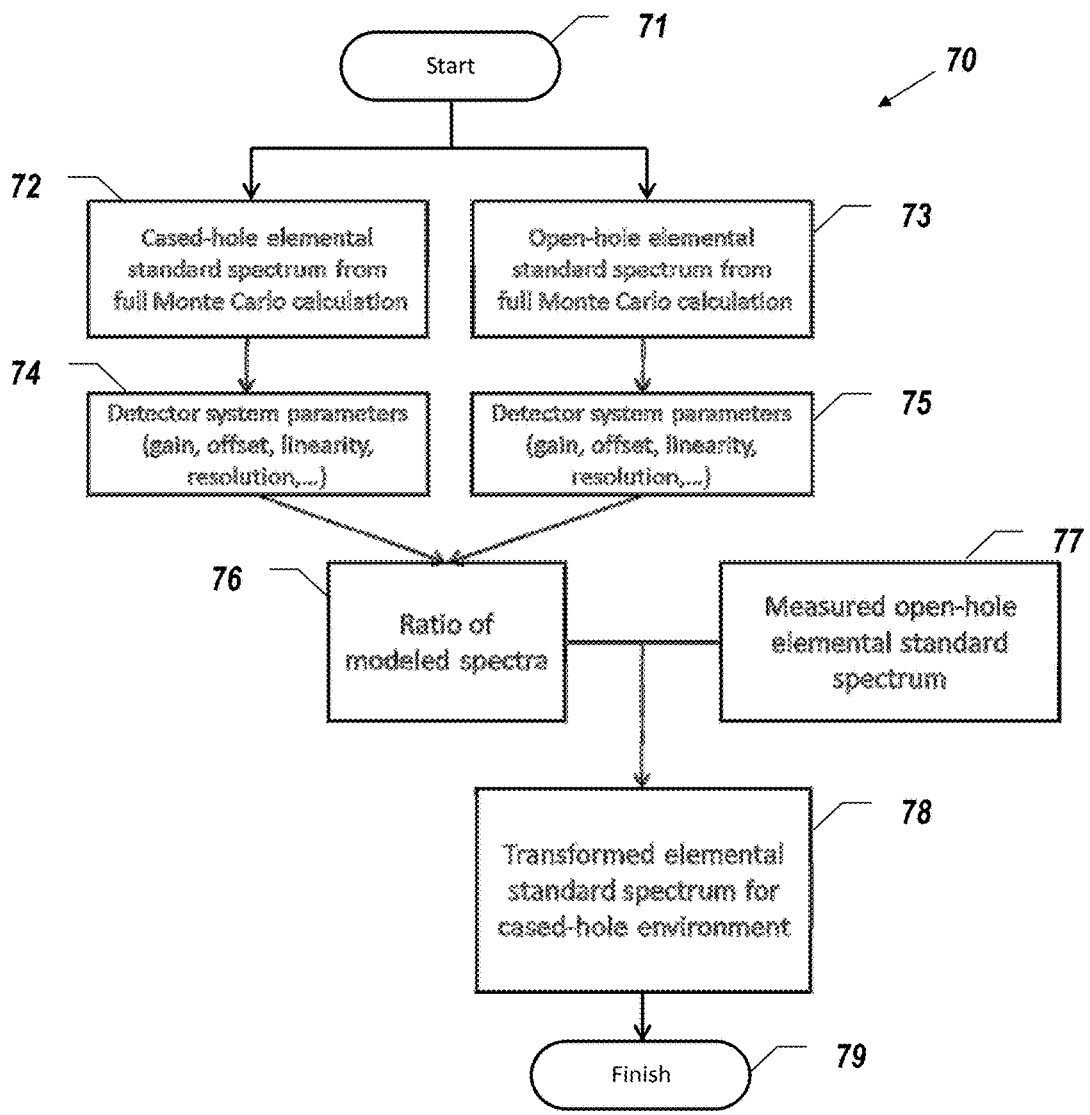
FIG. 3 is a flow diagram illustrating a method for estimating geological constituents in accordance with an example embodiment using full Monte Carlo calculations.
Figure 4:
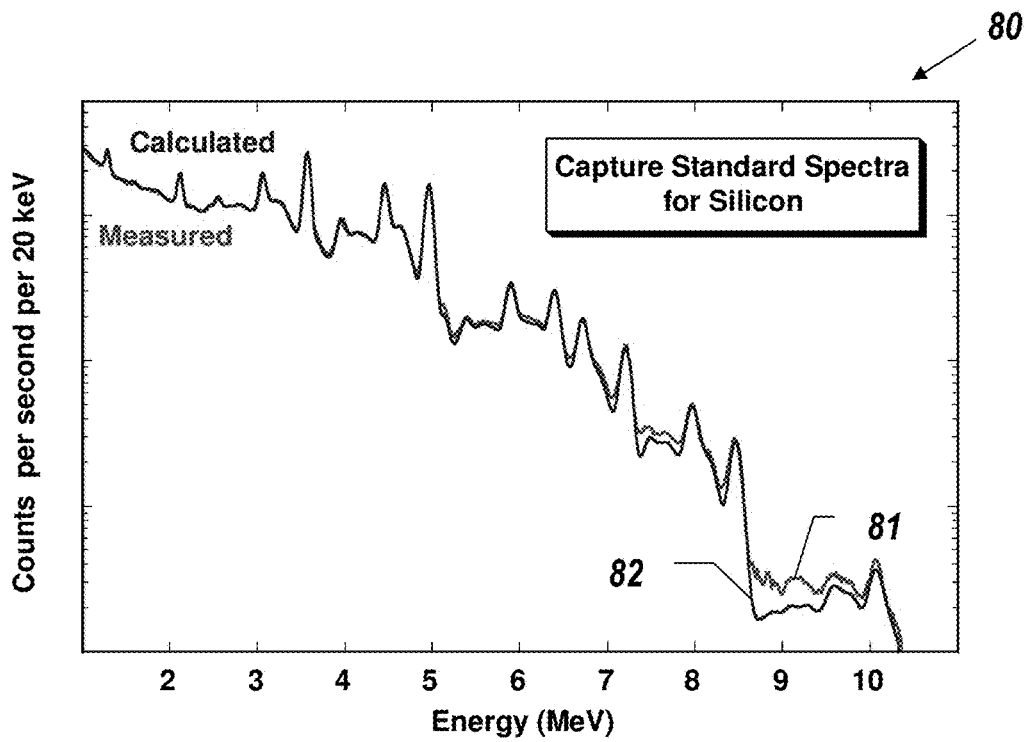
FIG. 4 is a graph of measured vs. calculated open-hole capture standard spectra for silicon.

Turning now to the flow diagram 70 of FIG. 3, an example embodiment for transforming standard spectra using full Monte Carlo calculations is now described. In the present example, the first borehole configuration is an open borehole, and the second borehole configuration is a cased borehole. The flow diagram 70 summarizes an example approach for transforming measured open-hole spectral standards using ratios of full Monte Carlo calculated spectra. With reference to the graph 80 of FIG. 4, it may be seen that the standard energy spectra plot 81 for silicon calculated (e.g., via Monte Carlo modeling) matches the measured standard spectra plot 82 for silicon relatively closely. While the difference between the two may be enough to avoid using the modeled capture spectra in place of the measured spectra, it has been determined that this difference is close enough that the relationship between calculated spectra for open and cased-hole environments (or other different environments) may be used to transform or extrapolate the measured spectra from the reference environment to a different borehole environment. Beginning at Block 71, the elemental standard spectra for the cased-hole and open-hole environments are respectively determined at Blocks 72, 73 using Monte Carlo calculations, although other suitable calculation techniques may be used in different embodiments, as will be appreciated by those skilled in the art.

Adjustment parameters may be applied to the calculated spectra as appropriate, such as those of the detector system, including the energy-to-channel calibration (e.g., the gain, offset, and linearity of the measurement system) and the energy dependence of the energy resolution. These parameters may then be applied to the Monte Carlo calculations for different elements in the various environments (Blocks 74, 75), or after determining the above-noted ratio, for example.

Figure 5:
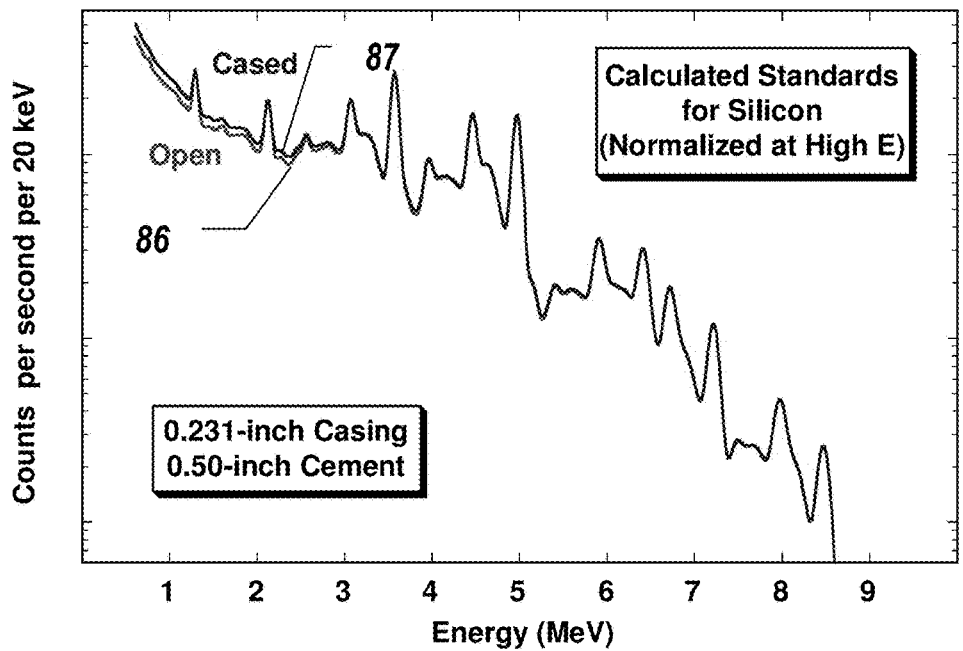
FIG. 5 is a graph of cased-hole vs. open-hole calculated capture standard spectra for silicon.

More particularly, referring to the graph 85 of FIG. 5, Monte Carlo calculations of the silicon standard spectra 86, 87 in both open-hole and cased-hole environments, respectively, are shown. In this example, a steel casing 0.231 inches thick was used, along with a cement liner 0.50 inches thick, although other casing or liner configurations or dimensions may be used in different embodiments. For comparison purposes, the spectra have been normalized to be equal at high energies. The calculations appear fairly similar above 3 MeV, but below this level more downscattering is present in the cased-hole environment, as well as more attenuation of the observable full-energy peaks.

Figure 6:
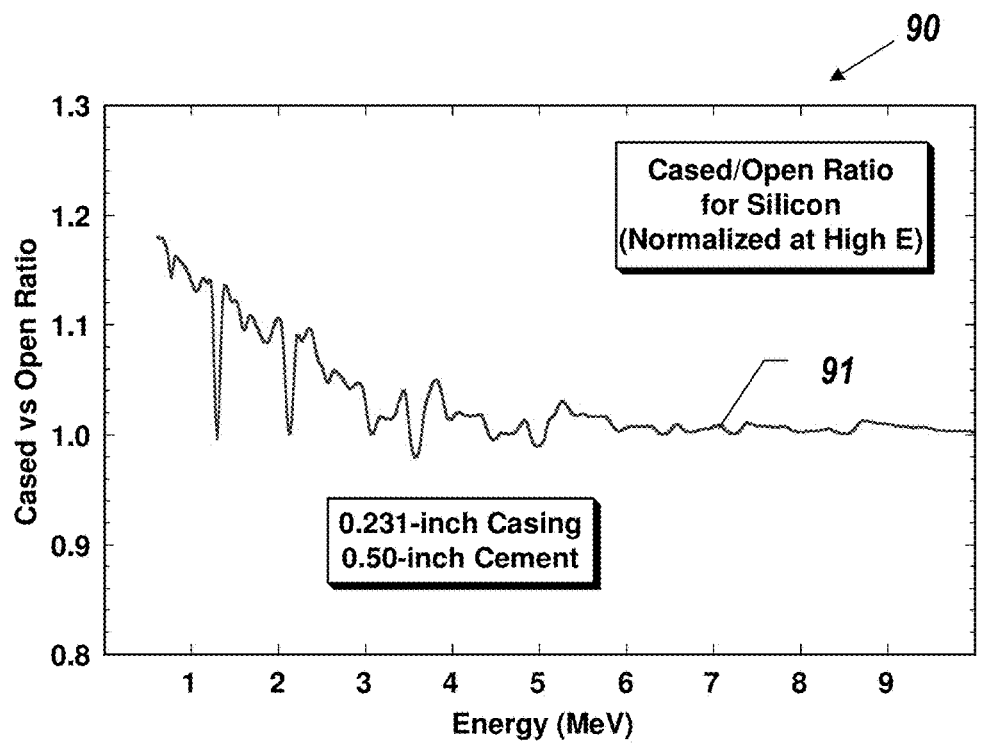
FIG. 6 is a graph of the ratio of cased-hole to open-hole capture standard spectra for silicon.
Figure 7:
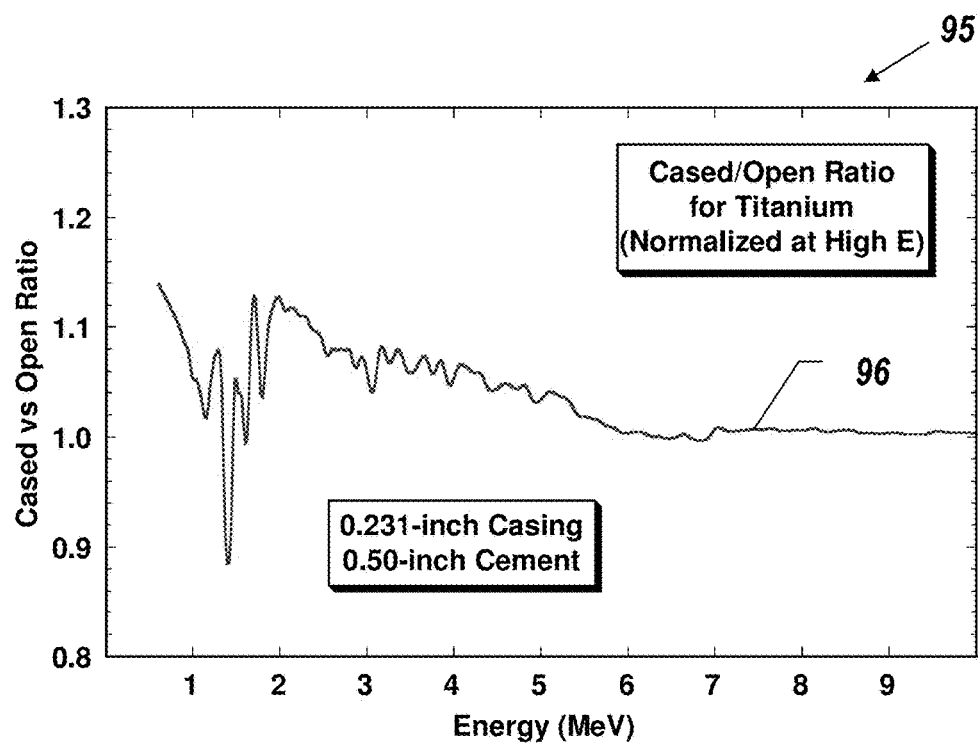
FIG. 7 is a graph of the ratio of cased-hole to open-hole capture standard spectra for titanium.

Referring to the graph 90 of FIG. 6, a plot 91 of the ratio (determined at Block 76) of cased-hole to open-hole Monte Carlo calculated standard spectra 87, 86 (from FIG. 5) for silicon for the above case of a 0.231-inch casing and 0.50 inches of cement is illustrated, again normalized at high energy. In the graph 95 of FIG. 7, a similar plot 96 of the ratio for titanium is shown. These ratios are the energy-dependent transformations that one may apply to the measured open-hole standard spectra for silicon and titanium (Block 77) to produce elemental standards appropriate for this cased-hole environment. It will be appreciated that the transform (Block 78) is different for each element, and thus a separate calculation for each element is used. The method of FIG. 3 illustratively concludes at Block 79.

Figure 8:
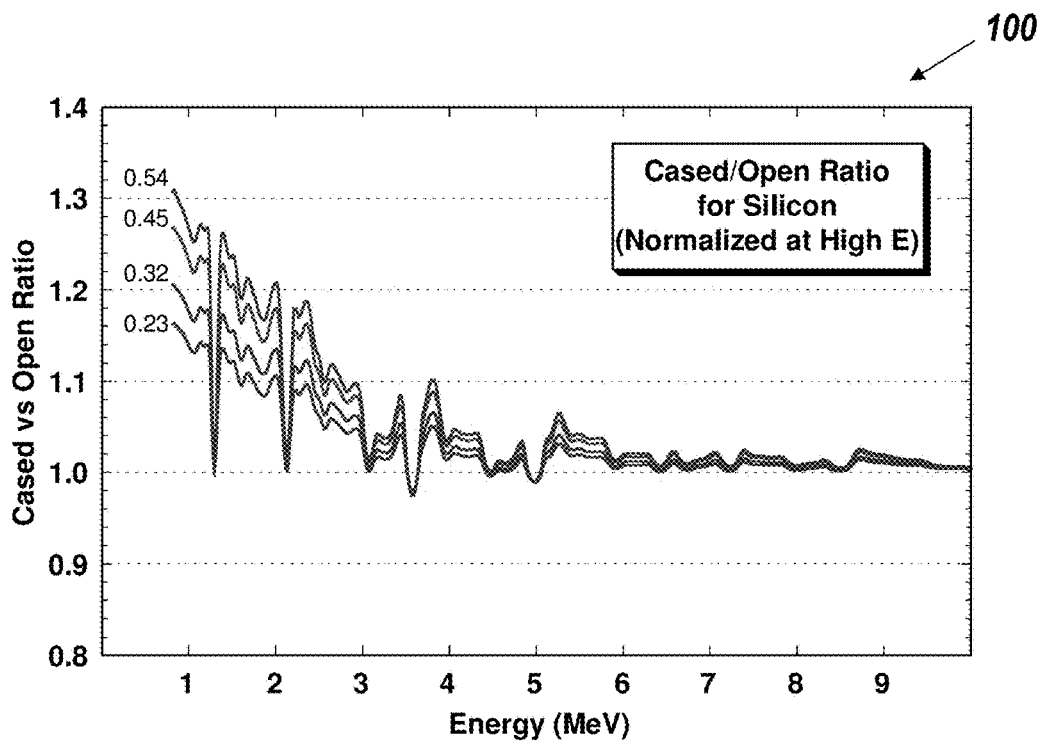
FIG. 8 is a graph illustrating the effects of casing thickness on the ratio of cased to open-hole capture spectra for silicon.
Figure 9:
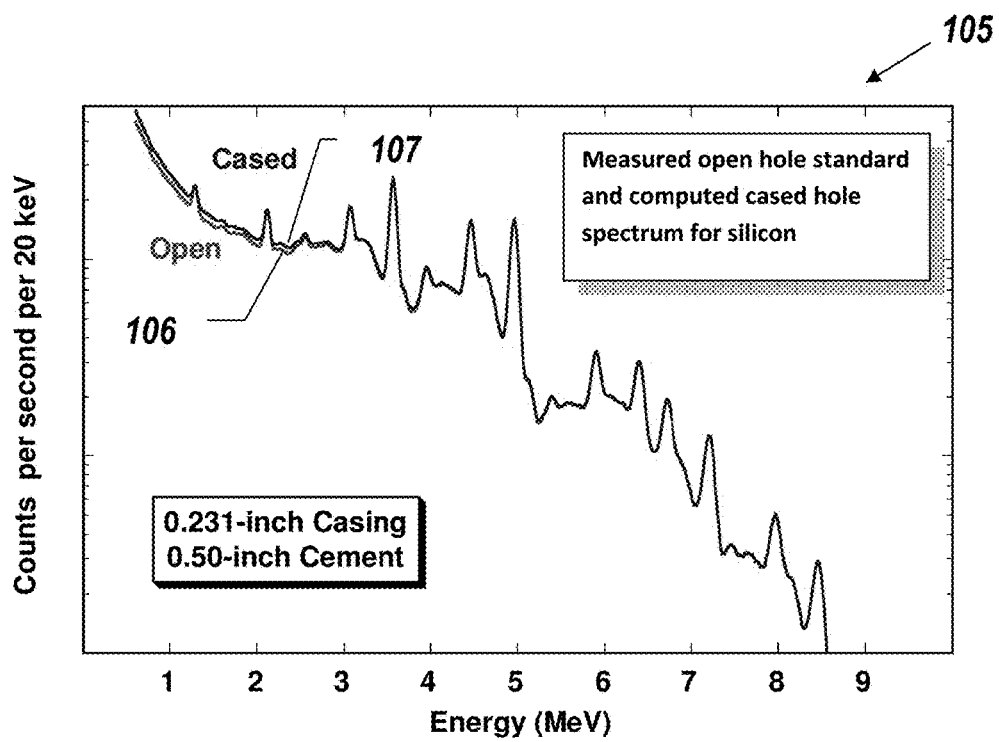
FIG. 9 is a graph of a cased-hole silicon standard transformed from the measured open-hole standard in accordance with an example embodiment.

Referring to the graph 100 of FIG. 8, the cased-hole to open-hole ratios for silicon calculated for four different steel casing thicknesses (namely 0.54 inches, 0.45 inches, 0.32 inches, and 0.23 inches, and all with a cement thickness of 0.5 inches), show that it is desirable to calculate the transform for each different environment to provide desired accuracy. With respect to applying the transform, the graph 105 of FIG. 9 compares the measured open-hole silicon standard spectrum 106 to the cased-hole silicon standard spectrum 107, which has been transformed to be appropriate for the environment of 0.231 inch casing and 0.50 inch cement using the techniques described herein.

In the above-described approach, elemental standard spectra were calculated using Monte Carlo calculations to track the entire history of the reactions from neutron production to gamma ray detection. While this technique may overall be the most accurate method available for most modeling applications, other approaches may also be suitable for certain applications. For example, referring now to the flow diagram 110 of FIG. 10, elemental standards calculations using gamma ray scattering functions may have some advantages when applied to transforming elemental standard spectra for different environments.

Beginning at Block 111, the premise here is to decouple the Monte Carlo calculation of gamma ray scattering from the underlying emission spectrum for a given element, at Block 112. This is possible because the scattering effects vary as a function of the logging environment, while the gamma ray production spectrum is a constant fundamental characteristic for each element and neutron reaction. Gamma ray production cross sections for each element are generally known, as will be appreciated by those skilled in the art. To model the scattering, Monte Carlo calculations may be used to generate a set of gamma ray "scattering functions" which represent the energy-dependent flux at the surface of the detector that results when gamma rays of a single energy are produced in the formation (Blocks 113, 114). The detector-specific response to this incident flux may be calculated and optimized as before, and then folded into the scattering functions, at Blocks 115, 116. The standard spectrum for each element may then be calculated as a linear combination of the appropriate scattering functions weighted by the gamma ray production cross sections for that element for each gamma ray energy.

Figure 11:
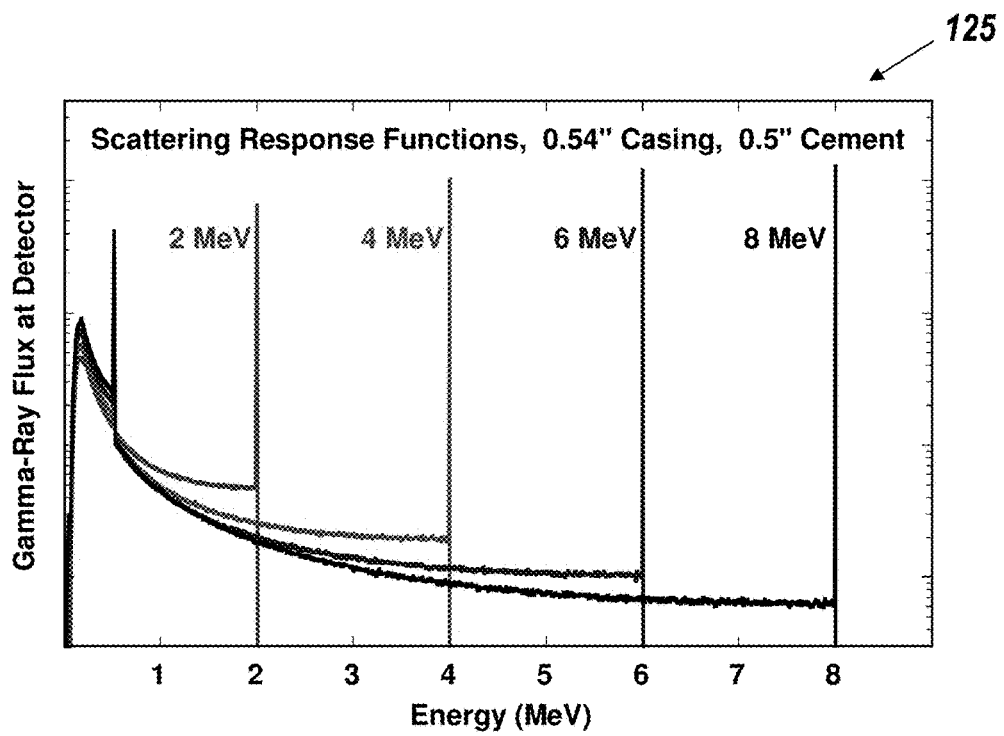
FIG. 11 is a graph of flux at the detector for mono-energetic gamma rays originating from the formation.

Generation of these scattering functions may be as follows. Starting with a characteristic spatial distribution of gamma rays produced in the formation, the Monte Carlo code may then track these gamma rays to the detector. The graph 125 of FIG. 11 shows the result of this calculation for four initial gamma ray energies at 2, 4, 6, and 8 MeV in the cased-hole environment with a casing thickness of 0.54 inches and cement thickness of 0.50 inches. These scattering functions should be available for an arbitrary energy, but because they vary so smoothly from one initial energy to the next, interpolation techniques based on calculations of a relatively small number of different original gamma ray energies may be used. This approach was tested with 110 gamma ray energies in 100-keV increments, but far fewer would have produced results of equivalent quality.

Figure 12:
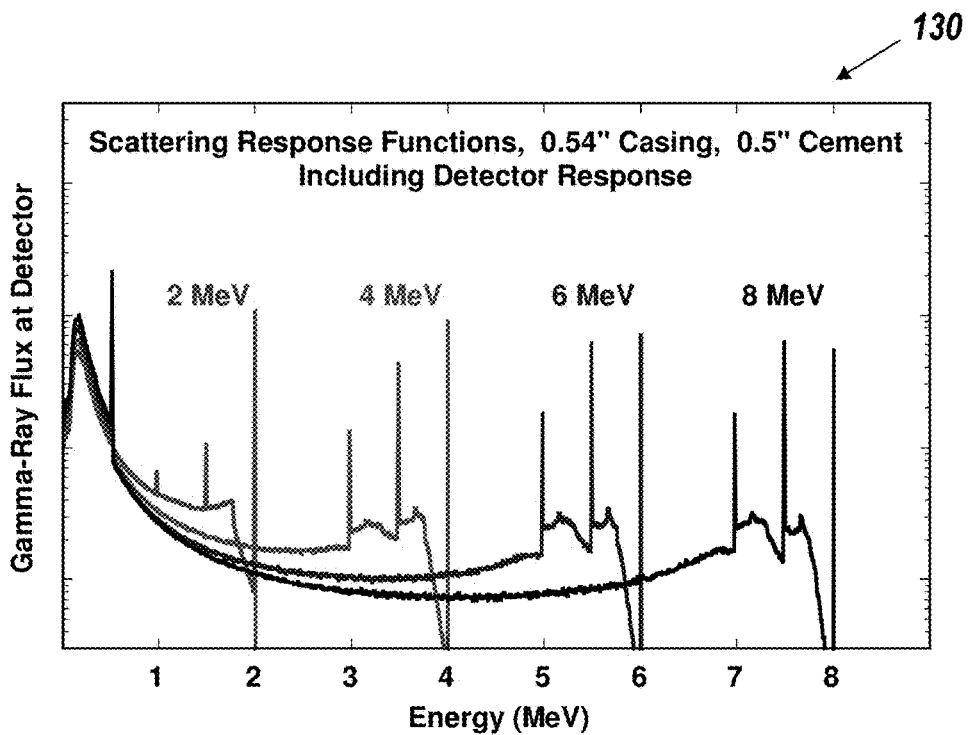
FIG. 12 is a graph in which the detector response is added to the scattering response functions from FIG. 11.
Figure 13:
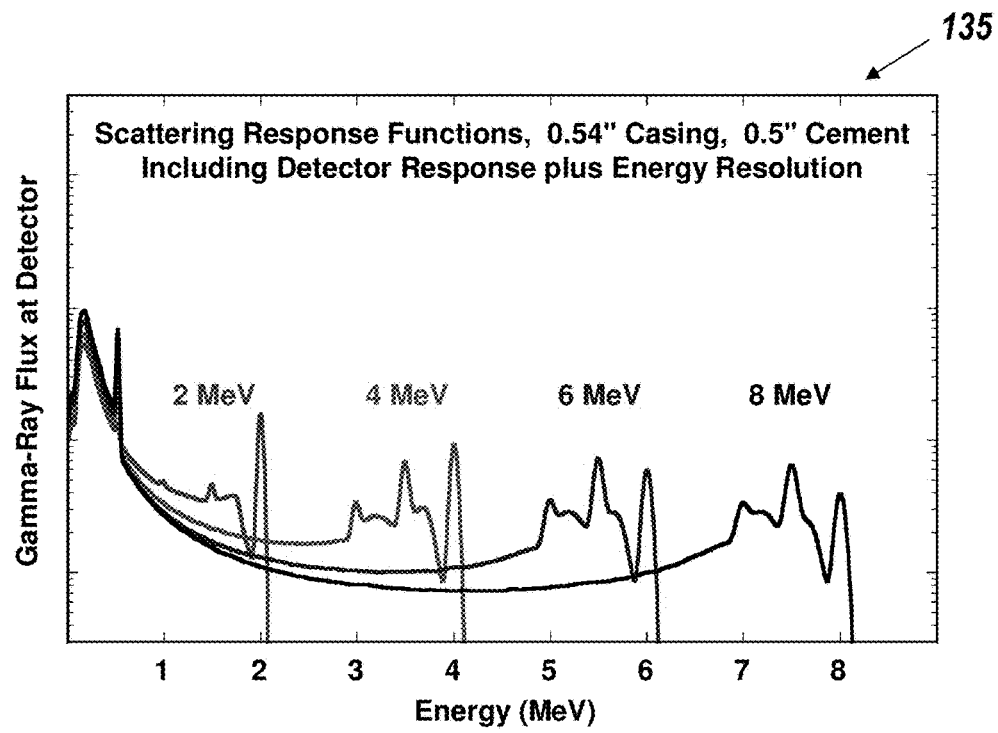
FIG. 13 is a graph in which the detector response and energy resolution are added to the scattering response functions from FIG. 12.

In the graph 130 of FIG. 12, part of the detector response has been added to the gamma ray scattering functions, showing the energy deposited in the detector system and not merely the flux striking the surface of the detector due to the mono-energetic formation gamma rays. This detector response is determined in a separate Monte Carlo calculation, which may be specific to the material and size of the detector being used for the measurements. Furthermore, in the graph 135 of FIG. 13, the detector energy resolution is also added to the scattering functions. Other parameters of the energy-to-channel calibration (e.g., gain, offset, nonlinearity) may also be matched to various measured spectra.

Figure 10:
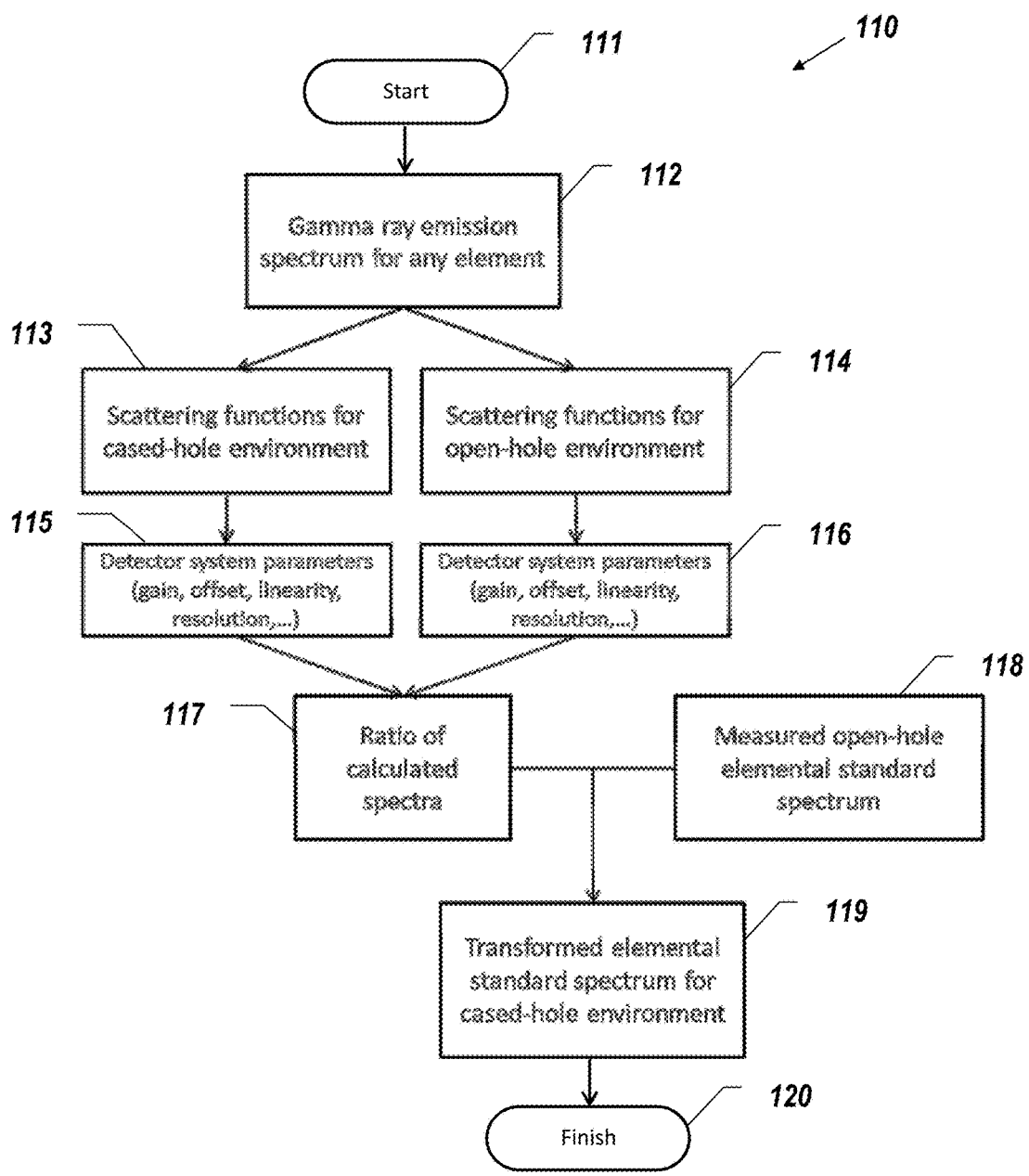
FIG. 10 is a flow diagram illustrating a method for estimating geological constituents in accordance with an example embodiment using scattering functions.

The result is the detector response for mono-energetic gamma rays originating in the formation, which may be interpolated for different arbitrary original gamma ray energies. Using tabulated gamma ray production cross sections for each element, the elemental standard spectrum may then be calculated as a linear combination of the appropriate scattering functions weighted by the gamma ray production cross sections for each gamma ray energy. As before, an energy-dependent transform may be derived by taking the ratio of two calculated elemental standards, namely one for the appropriate cased-hole environment and one for the open-hole environment of the measured standard (Blocks 117-119). This spectral ratio may be multiplied by the measured open-hole standard, as discussed above. The method of FIG. 10 illustratively concludes at Block 120.

Figure 14:
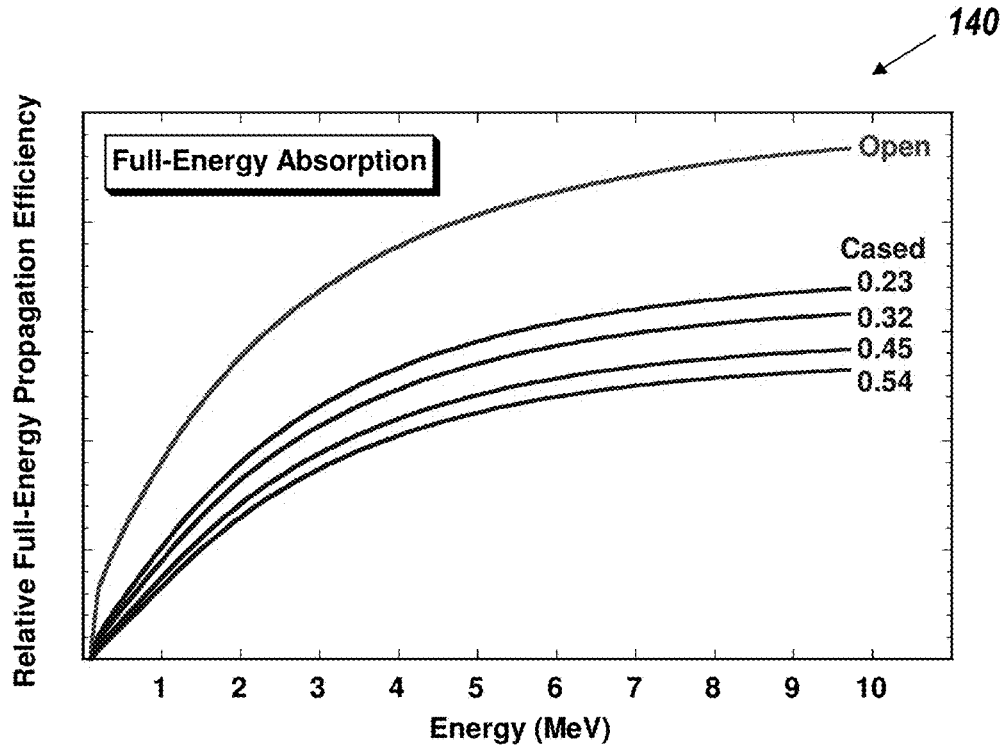
FIG. 14 is a graph of relative full-energy propagation efficiency at the detector for mono-energetic gamma rays originating from the formation.

Various advantages of the foregoing approach to estimating elemental standard spectra will be appreciated. For example, because the gamma ray scattering functions are relatively "well behaved" (i.e., smoothly varying), it may be possible to predict them for an arbitrary environment based on a targeted number of environments used for the explicit calculations. For example, the graph 140 of FIG. 14 shows the relative full energy propagation efficiency for several different cased-hole environments. A parameterization of this quantity, possibly combined with other environmentally dependent parameters, may be used to generate scattering functions for a given combination of casing and cement geometry.

Furthermore, unlike using full Monte Carlo calculations for each elemental standard, with this approach no statistical sampling has to be performed for the gamma ray production cross sections. The emission lines are a known constant, and the Monte Carlo simulation is devoted to the effects of gamma ray scattering. This notably reduces the statistical scatter when computing the spectral ratio for different environments. This is illustrated by the regularity seen in FIG. 8, since the ratios here came from elemental standards calculated via the scattering function approach.

In addition, the best available gamma ray production cross sections for each element may be used even though they might not have been incorporated into the existing Monte Carlo code. Moreover, once the scattering functions have been calculated, the elemental standard spectra for any element for which gamma ray production cross sections are known may be calculated extremely quickly. The addition of new elemental standards to the spectral analysis may not warrant a new set of Monte Carlo calculations.

Despite such computational advantages, the scattering function approach may be less accurate than using full Monte Carlo simulations of the elemental spectra. One notable advantage of the fully detailed simulation is that it accounts for how the logging environment affects the transport and scattering of neutrons. The spatial distribution of neutrons around the tool determines the shape of the gamma ray source in the formation, borehole, and completion. While the scattering functions in their simplest form use a constant spatial distribution of gamma rays in the formation, in reality the originating gamma ray distribution depends on parameters including, but not limited to: formation hydrogen index; formation density; borehole size; borehole fluid; and the geometry of the casing and/or cement. A more detailed implementation of the scattering function method may take these parameters into account, such as by using a customized photon source distribution for each combination of borehole size and casing geometry, for example, as will be appreciated by those skilled in the art.

As noted above, the transforms may be used for additional properties of the logging environment as well. While the derivation of cased-hole standard spectra may be the application of particular interest for the above-described ratio-transformation approaches, the true shape of the spectrum for each element is affected by other properties of the logging environment as well. This is true for properties of open-hole environments as well as the details of the completion in a cased-hole environment. Therefore, the approaches described herein have potential applications for transforming standard spectra, whether open-hole or cased-hole, based on other properties of the formation or borehole that affect neutron and gamma ray scattering.

Figure 15:
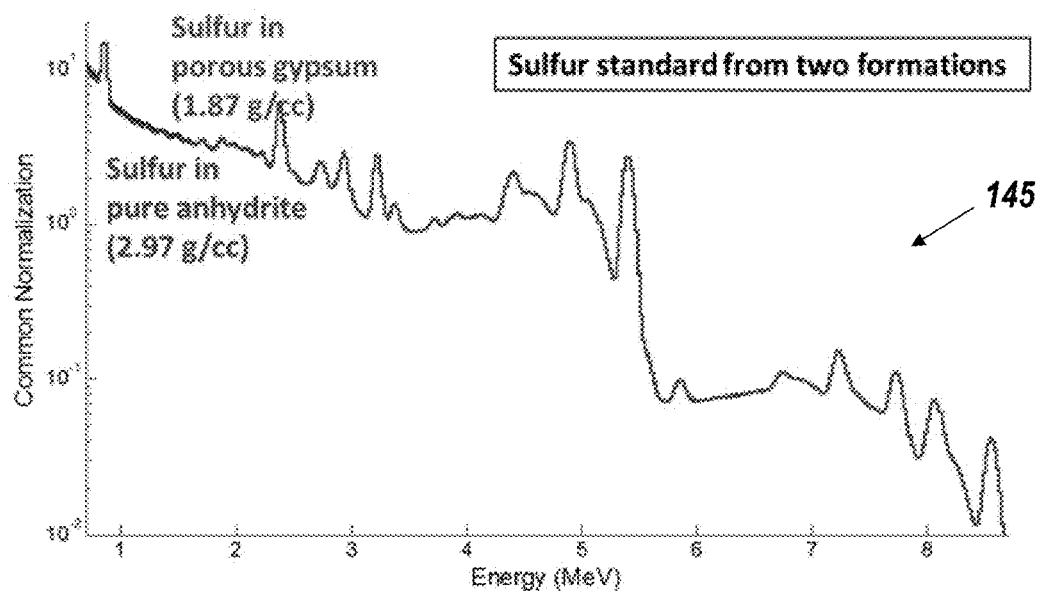
FIG. 15 is a graph illustrating calculated capture standard spectra for sulfur from a high-density and a low-density formation.
Figure 16:
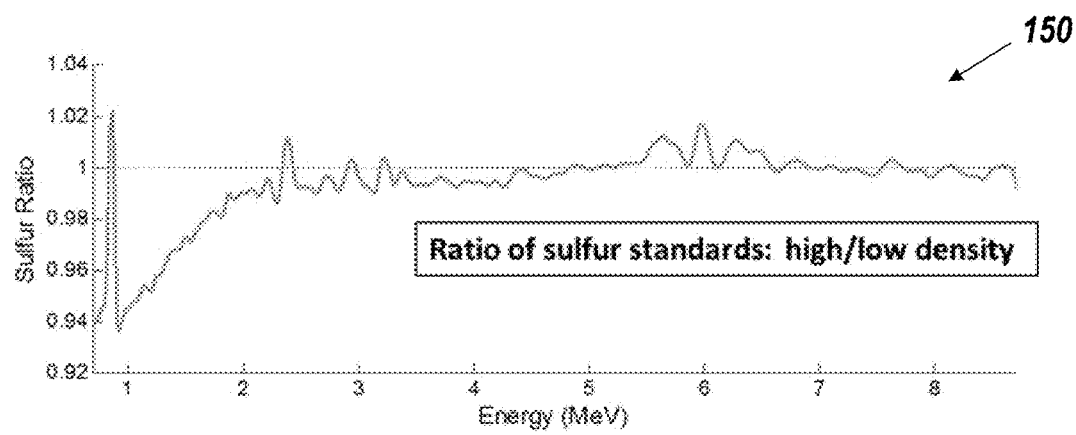
FIG. 16 is a graph of the ratio between the calculated capture standard spectra from FIG. 15.

As one of many possible illustrative examples, a potential application would be to transform open-hole standards based on formation density. For example, the graph 145 of FIG. 15 shows full Monte Carlo calculations of the sulfur capture spectrum from two formations: a high-density formation of 0-p.u. anhydrite at 2.97 g/cc, and a lower-density formation of porous gypsum at 1.87 g/cc. The spectra are normalized together at high energy. The graph 150 of FIG. 16 shows the ratio of the two spectra. The spectral difference in this example is not as pronounced as in the previous cased-hole examples. However, the ratio in FIG. 16 shows that there is an energy-dependent difference that is neglected in an analysis with fixed spectral shapes.

A set of spectral ratios based on formation density at various intervals may be derived from full Monte Carlo calculations for each element, as in this example for sulfur. Also, the approach using scattering functions may be developed here, using Monte Carlo to calculate the scattering behavior for mono-energetic gamma rays originating in formations of various densities. Each approach has advantages and disadvantages as discussed above, but this example indicates that the accuracy of the full Monte Carlo calculation may be desirable for capturing the subtle spectral differences seen in FIG. 15.

Of particular note is that the sulfur-from-anhydrite spectrum is lower at low energy than that of the sulfur from the less dense gypsum formation, and its full-energy peaks are slightly more pronounced. This result is counter-intuitive when considering just the effects of density on gamma ray scattering, that is, high density causes more attenuation and scattering which should shift the spectrum toward low energy. However, these formations also have very different porosity and hydrogen index, which affects the spatial distribution of neutrons. That is, the low-porosity anhydrite allows more thermal energy neutrons close to the detector, which reduces the distance that the resulting gamma rays have to travel to be detected. Variation in liquid-filled porosity therefore causes simultaneous changes in neutron and gamma ray transport that partially cancel one another in the final shape of the detected spectrum. In contrast, a change in gas-filled porosity would have much less effect on hydrogen index, and the neutron transport would exhibit yet a different behavior when the density changes.

A more rigorous implementation of the full Monte Carlo approach would be to calculate ratio transforms that depend simultaneously on formation density and hydrogen index. By contrast, such effects may be included in an implementation of the scattering function approach, e.g., by calculating density-dependent scattering functions in which the initial gamma ray distribution depends on hydrogen index. These interdependences are more naturally coupled in the full Monte Carlo approach as shown here. The skilled artisan will accordingly appreciate that the illustrative example may be repeated for many different physical properties of the logging environment or a combination thereof, including formation hydrogen index or porosity, formation density, borehole size, borehole fluid, positioning of the tool in the borehole, details of a cased-hole completion as previously discussed, etc.

In addition to applications based on the logging environment, the above-described ratio transforms may also be used to address tool-to-tool variation in spectral response. Normally, elemental standard spectra are derived from laboratory measurements with a tool which is chosen for its good performance. Each tool has a slightly different spectral response, and it is a routine part of the analysis to make adjustments to the elemental standards to optimize them for the downhole measurements by other tools. These adjustments include the spectral response parameters previously discussed, including nonlinearity and the degradation of energy resolution. However, some aspects of tool-to-tool variation are more challenging to adjust for, and they may be good candidates for treatment with the method of calculated ratio transforms.

Figure 18:
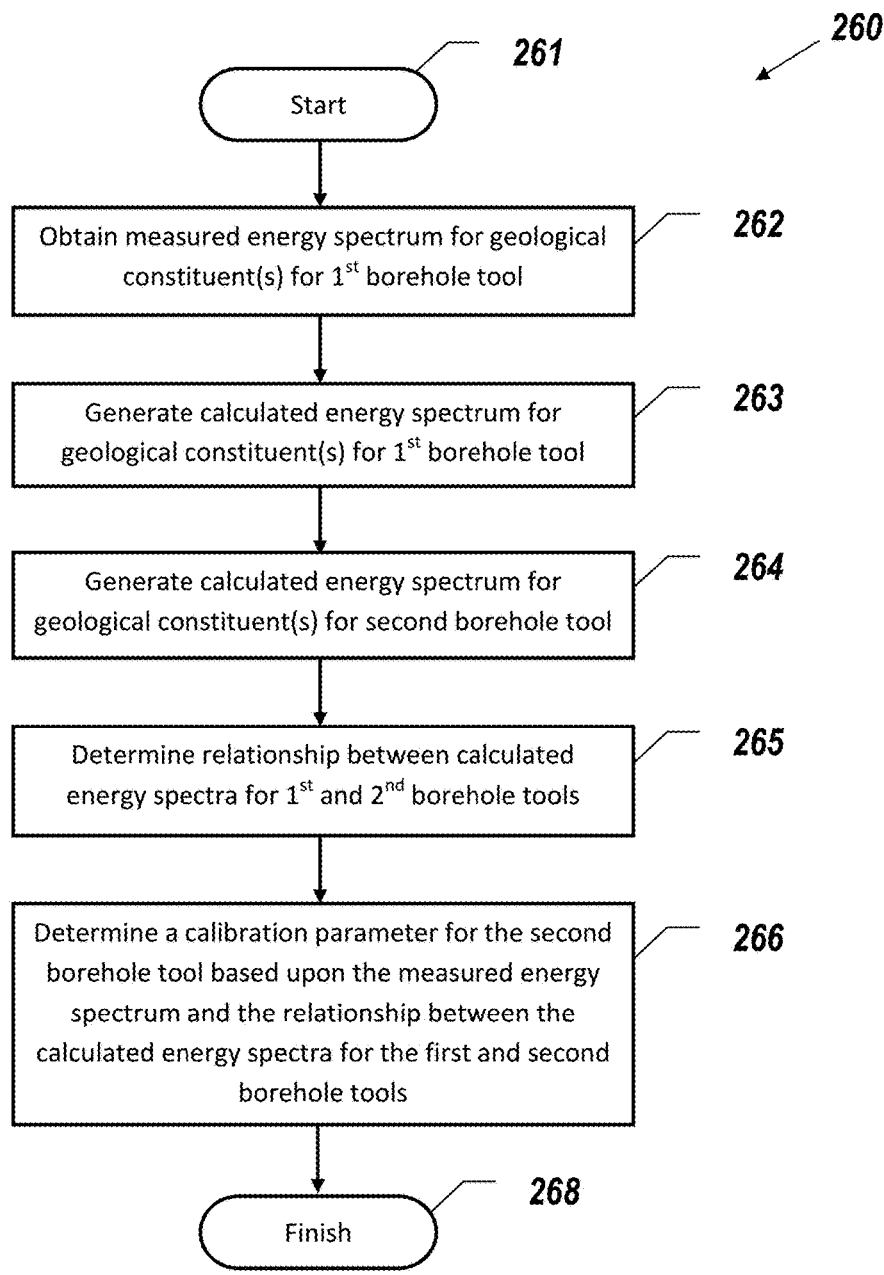
FIG. 18 is a flow diagram illustrating a method for estimating geological constituents across different borehole tools in accordance with an example embodiment.

Referring to the flow diagram 260 of FIG. 18, beginning at Block 261, an example approach for calibrating borehole tools is now described. More particularly, the above-described "ratio of calculated standards" technique may be used for tool calibration with respect to detector response, and it takes advantage of being able to adjust the detector response in the calculations. This allows for detector calibration to account for (1) differences in peak-shape, and (2) differences in the position of the escape peaks. That is, the shapes of energy peaks and/or the separation between the full energy peak and escape peaks in a spectral response may be different in different detectors, e.g., as a result of detector crystal differences, etc.

A measured energy spectrum for at least one geological constituent for a first borehole tool may be obtained at Block 262, along with generating a calculated energy spectrum for the at least one geological constituent for the first borehole tool (Block 263), and generating a calculated energy spectrum for the at least one geological constituent for a second borehole tool, which is different than the first borehole tool (Block 264), as discussed above. Moreover, the method further illustratively includes determining a relationship (e.g., a ratio) between the calculated energy spectra for the first and second borehole tools, at Block 265, and determining a calibration parameter (e.g., a different peak shape or peak separation) for the second borehole tool based upon the measured energy spectrum and the relationship between the calculated energy spectra for the first and second borehole tools, at Block 266 which illustratively concludes the method of FIG. 18 (Block 268).

For the peak shape calibration, the standards may be calculated by adding resolution degradation both with symmetric Gaussians and with asymmetric Gaussians, where the degree of asymmetry would be determined from the difference in the H-peaks shapes in a water-tank calibration, for example. An advantage of this approach over performing a transform to a composite spectrum is that it handles each of the detected gamma rays individually because they are known in the calculation.

There may be a similar advantage to using this technique for an escape-peak shift calibration. For example, using the above-noted calculations it is straightforward to identify the escape peaks in the detector response functions since they are for a single energy gamma ray and originally have no resolution degradation, as will be appreciated by those skilled in the art. Thus, a new set of detector response functions may be created with all of the escape peaks shifted, including (if necessary) the double escapes, and this would then act on every detected gamma ray.

A process flow for a calibration procedure in accordance with one example embodiment may be as follows:

1. Perform Monte Carlo calculations for elemental standard spectra;
2. Add detector response for first tool (e.g., gain, offset, nonlinearity, energy resolution, peak asymmetry, escape-peak separation);
3. Add detector response for second tool (e.g., gain, offset, nonlinearity, energy resolution, peak asymmetry, escape-peak separation);
4. Compute the ratio of calculated elemental standard spectra for second vs. first tools;
5. Transform elemental standards measured by first tool to standards appropriate for second tool;
6. Use transformed standards to reconstruct a calibration measurement made by the second tool; and
7. Test for desired fit, which if obtained concludes the process, but if not different parameters are chosen for the detector response of the second tool and the process reverts back to step 3.

One example of a non-trivial transformation is to take an elemental standard spectrum and improve its energy resolution. Normally, the standards are measured with a tool that has among the best resolution available so that other tools just have to degrade the resolution of those standards (e.g., by a relatively simple convolution with a Gaussian distribution). Occasionally, however, downhole measurements are made with better resolution than appears in the laboratory elemental standards. There is no simple convolution operation to "reverse" resolution degradation. An advantage of the above-described ratio transforms is that the elemental standards may be calculated with different energy resolutions, whether via the approach of fully detailed Monte Carlo calculations or the approach of scattering functions. To find the appropriate ratio for transformation, one may calculate the standard spectrum with the nominal energy resolution of the measured set of standards, and also with the better resolution of the new measurement.

Figure 17:
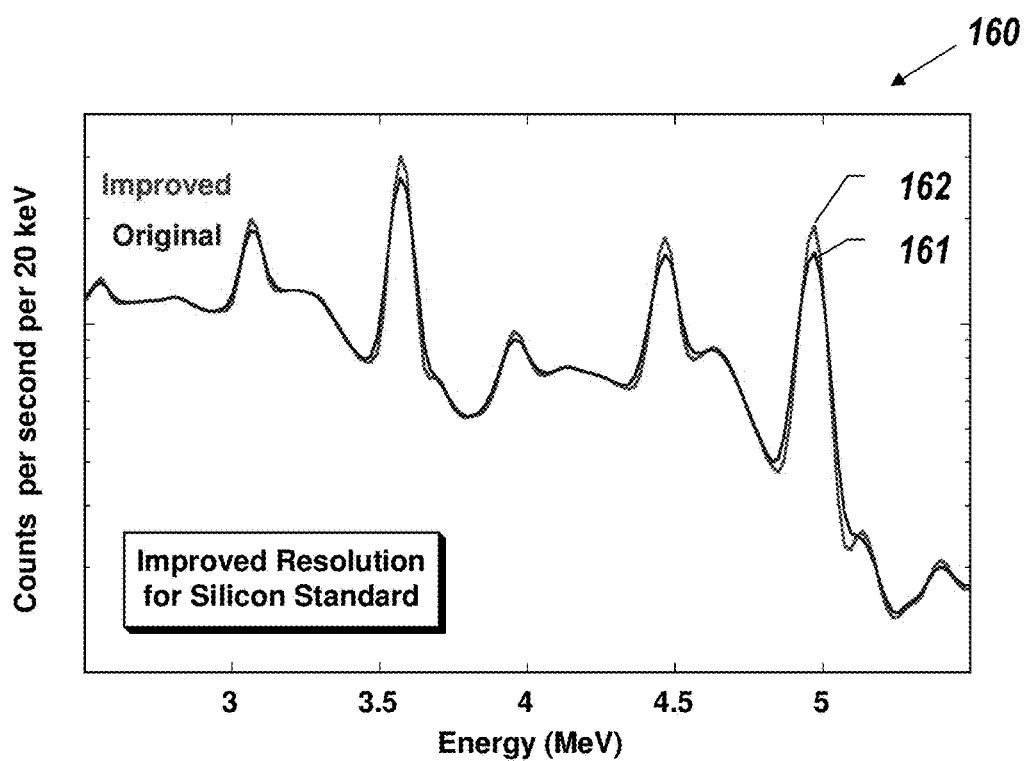
FIG. 17 is a graph of an example of a spectrum with nominal energy resolution, and one which has been transformed by the method illustrated in FIG. 3 to have improved resolution (e.g., narrower peaks).

The graph 160 of FIG. 17 shows an example of a capture silicon standard plot 161 with nominal energy resolution, and a plot 162 for a version which has been transformed by such a ratio to have improved resolution. It is a relatively straightforward exercise to degrade the improved spectrum with a traditional convolution and verify that the result is nearly equivalent to the original spectrum.

Another potential application of the above-described approaches relates to the tool-to-tool variation of peak shapes, and more specifically how some detector systems produce peaks that are slightly asymmetrical. It may be desirable to adapt the nominal set of elemental standard spectra to match the appropriate peak shape behavior for each tool, but this may ordinarily be a somewhat difficult operation. However, by calculating one standard spectrum using the spectral response that corresponds to the measured standards, and then calculating another spectrum with a greater degree of asymmetry, we can again produce a ratio that provides the desired transformation, as will be appreciated by those skilled in the art.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method for calibrating tool-to-tool variations, comprising:
    obtaining a measured energy spectrum for at least one geological constituent based upon a first borehole tool;
    generating a calculated energy spectrum for the at least one geological constituent for the first borehole tool;
    generating a calculated energy spectrum for the at least one geological constituent for a second borehole tool different than the first borehole tool;
    determining a relationship between the calculated energy spectra for the first and second borehole tools;
    determining a calibration parameter for the second borehole tool based upon the measured energy spectrum and the relationship between the calculated energy spectra for the first and second borehole tools, and
    applying the calibration parameter for the second borehole tool to address tool-to-tool variations.

2. The method of claim 1 wherein the calculated energy spectrum for the at least one geological constituent for the second borehole tool has a plurality of energy peaks therein having a spectral separation therebetween; and wherein the calibration parameter corresponds to a second spectral separation between the plurality of energy peaks different than the first spectral separation.

3. The method of claim 1 wherein the calculated energy spectrum for the at least one geological constituent for the second borehole tool has at least one energy peak therein; and wherein the calibration parameter corresponds to a different peak shape for the at least one energy peak.

4. The method of claim 1 wherein the relationship between the calculated energy spectra for the first and second borehole tools comprises a ratio thereof.

5. The method of claim 1 wherein generating the calculated energy spectra comprises calculating the energy spectra for the at least one geological constituent using Monte Carlo calculations of a gamma ray scattering response as a function of gamma ray energy for the first and second borehole tools, respectively.

6. The method of claim 1 wherein generating the calculated energy spectra for the first and second borehole tools comprises calculating energy-dependent flux from gamma rays of a given energy level for the first and second borehole tools.

7. The method of claim 1 wherein the first and second borehole tools have different respective resolutions.

8. The method of claim 1 wherein at least one of the first and second borehole tools comprises a gamma ray detector.

9. An apparatus for calibrating tool-to-tool variations, comprising:
    a processor and a memory cooperating therewith to
        obtain a measured energy spectrum for at least one geological constituent based upon a first borehole tool,
        generate a calculated energy spectrum for the at least one geological constituent for the first borehole tool,
        generate a calculated energy spectrum for the at least one geological constituent for a second borehole tool different than the first borehole tool,
        determine a relationship between the calculated energy spectra for the first and second borehole tools,
        determine a calibration parameter for the second borehole tool based upon the measured energy spectrum and the relationship between the calculated energy spectra for the first and second borehole tools, and
        applying the calibration parameter for the second borehole tool to reduce tool-to-tool variations.

10. The apparatus of claim 9 wherein the calculated energy spectrum for the at least one geological constituent for the second borehole tool has a plurality of energy peaks therein having a first separation therebetween; and wherein the calibration parameter corresponds to a second spectral separation between the plurality of energy peaks different than the first spectral separation.

11. The apparatus of claim 10 wherein the calculated energy spectrum for the at least one geological constituent for the second borehole tool has at least one energy peak therein; and wherein the calibration parameter corresponds to a different peak shape for the at least one energy peak.

12. The apparatus of claim 9 wherein the relationship between the calculated energy spectra for the first and second borehole tools comprises a ratio thereof.

13. The apparatus of claim 9 wherein the calculated energy spectra are generated by calculating the energy spectra for the at least one geological constituent using Monte Carlo calculations of a gamma ray scattering response as a function of gamma ray energy for the first and second borehole tools, respectively.

14. The apparatus of claim 9 wherein the calculated energy spectra for the first and second borehole tools comprises are based upon calculated energy-dependent flux from gamma rays of a given energy level for the first and second borehole tools.

15. A non-transitory computer-readable medium having computer-executable instruction for causing a computer to at least:
   obtain a measured energy spectrum for at least one geological constituent based upon a first borehole tool;
   generate a calculated energy spectrum for the at least one geological constituent for the first borehole tool;
   generate a calculated energy spectrum for the at least one geological constituent for a second borehole tool different than the first borehole tool;
   determine a relationship between the calculated energy spectra for the first and second borehole tools; and
   determine a calibration parameter for the second borehole tool based upon the measured energy spectrum and the relationship between the calculated energy spectra for the first and second borehole tools, and
   applying the calibration parameter for the second borehole tool to reduce tool-to-tool variations.

16. The non-transitory computer-readable medium of claim 15 wherein the calculated energy spectrum for the at least one geological constituent for the second borehole tool has a plurality of energy peaks therein having a first separation therebetween; and
   wherein the calibration parameter corresponds to a second spectral separation between the plurality of energy peaks different than the first spectral separation.

17. The non-transitory computer-readable medium of claim 16 wherein the calculated energy spectrum for the at least one geological constituent for the second borehole tool has at least one energy peak therein; and wherein the calibration corresponds to comprises a different peak shape for the at least one energy peak.

18. The non-transitory computer-readable medium of claim 15 wherein the relationship between the calculated energy spectra for the first and second borehole tools comprises a ratio thereof.

19. The non-transitory computer-readable medium of claim 15 wherein the calculated energy spectra are generated by calculating the energy spectra for the at least one geological constituent using Monte Carlo calculations of a gamma ray scattering response as a function of gamma ray energy for the first and second borehole tools, respectively.

20. The non-transitory computer-readable medium of claim 15 wherein the calculated energy spectra for the first and second borehole tools comprises are based upon calculated energy-dependent flux from gamma rays of a given energy level for the first and second borehole tools.

* * * * *